United States Patent Office 3,029,231
Patented Apr. 10, 1962

3,029,231
PROCESS FOR POLYMERIZING OLEFINS
Gerrit Jan van Amerongen, Amsterdam, Netherlands, assignor to Shell Oil Company, a corporation of Delaware
No Drawing. Filed Sept. 27, 1957, Ser. No. 686,566
Claims priority, application Netherlands Oct. 17, 1956
3 Claims. (Cl. 260—87.5)

This invention relates to improved methods for the polymerization of alpha-olefins. More particularly, it relates to improved methods for the polymerization of alpha-olefins whereby products of controlled molecular weights are obtained.

It is now well known that polymers of alpha-olefins may be prepared at low temperatures and pressures in the presence of certain catalyst compositions. Such processes are conducted at temperatures ranging from about ambient temperatures to about 150° C. and pressures below 500 p.s.i. The catalysts are designated in the art generally as "Ziegler catalysts" or "low pressure catalysts." Such catalysts are capable of polymerizing alpha-olefins, as ethylene, butene-1, propene, styrene and other alpha-olefins.

The processes of the present invention relate to improved methods of producing polyethylene, polypropylene, polystyrene, and other polymers of alpha-olefins. It also relates to the polymerization of mixtures of such olefins to produce copolymers. As the technology as it relates to the polymerization of alpha-olefins by the use of low pressure catalysts is substantially the same, this invention will be described as it relates to the production of certain homopolymers but it will be readily understood that the invention is of general application to the polymerization of alpha-olefins and copolymers thereof using the "low pressure catalysts."

As indicated above, the catalysts which are utilized in processes of this invention are the so-called "low pressure catalysts." They may be selected from A through E as follows:

A. The reaction product of (1) a compound of a metal selected from groups IV, V, VI and VIII of the periodic table and manganese with (2) a compound of the formula $R_2R_1AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan thiophenol, carboxylic acid and sulfonic acid, B. The reaction product of (1) a compound of a metal from groups IV, V, VI and VIII of the periodic table and manganese with (2) a compound selected from the group consisting of aluminum trialkyl, magnesium alkyl, zinc alkyl and Grignard compound, C. A composition comprising aluminum trichloride, titanium tetrachloride, and aluminum, D. Chromium oxide on alumina, and E. An oxide of a metal from group VI of the periodic table.

It is known that in the polymerization of olefins, as ethylene, the molecular weight of the polymer produced may be varied according to the ratio of the catalyst-forming components employed to form the catalyst mixture. Thus, when an aluminum alkyl, or aluminum alkyl halide, is used with titanium tetrachloride, the molecular weight of the polymer increases with an increasing molar ratio of aluminum to titanium. There are, however, reasons connected with the yield and the rate of reaction why this effect cannot be used to obtain molecular weights as low as is sometimes desirable. The problem of controlling molecular weight also arises when using highly purified olefins and solvent.

It is an object of this invention to provide improved methods for the polymerization of alpha-olefins whereby the molecular weight of the product can be controlled. It is another object of this invention to provide improved methods for the polymerization of alpha-olefins, particularly ethylene, at low temperatures and pressures, using the so-called "low pressure catalysts" whereby the molecular weight of the product may be controlled. Other objects will become apparent as the description proceeds.

These and other objects are accomplished in the method for the polymerization of alpha-olefins at temperatures below about 150° C. and pressures below about 500 p.s.i. in the presence of a low pressure catalyst by the improvement which comprises conducting the polymerization in the presence of a minor amount of at least one other vinyl compound. It will be understood that the vinyl compound which is present in minor portions is different from the alpha-olefin to be polymerized. Thus, for example, if ethylene is to be polymerized then the vinyl compound will have more than 2 carbon atoms. On the other hand, if a different alpha-olefin is to be polymerized as, for example, propylene, then the added vinyl compound may include ethylene and will exclude propylene. In all cases the addition of the vinyl compound will lower the molecular weight of the polymer as compared to processes wherein the added vinyl compounds are not employed.

The vinyl compound which is added in a minor portion to the polymerization mixture has a structural entity $CH_2=C<$, that is a terminal $CH_2$ group. Representative compounds of this type include propylene, hexene-1, decene-1, 2-methyl butene-1, styrene, isopropylethylene, and the like.

In the preferred embodiment the vinyl compound has 2 to 10 carbon atoms and only 1 ethylenically unsaturated double bond. However, this preference is based largely on ease of processing and vinyl compounds having a greater number of carbon atoms or more than one ethylenic double bond may be employed. Among such compounds there may be mentioned butadiene, isoprene, 1,3-pentadiene, hexatriene, 1-vinyl-1-cyclohexene, butyl-1,3-butadiene, and the like.

The vinyl compound which is added in minor portions is not limited to hydrocarbons as halogenated compounds are also suitable such as vinyl chloride, vinylidene chloride, vinyl bromide, allyl iodide, 5-chloropentene-1, and the like.

The quantity of the added vinyl compound employed preferably ranges from 0.001 to 10 mole percent of the alpha-olefin which is to be polymerized. More preferred, the quantity ranges between 0.002 and 5 molar percent. As the quantity of the vinyl compound which is needed will vary depending upon a number of considerations, such as the purity of the olefin feed, the purity of the catalyst, the molecular weight desired and the like, it is preferred to first ascertain the quantity of the vinyl compound to be added. This may be accomplished by an initial trial wherein a polymer is first formed without the addition of the vinyl compound which is taken as the standard. Thereafter polymerization is conducted with say 0.002 molar percent of the selected vinyl compound, calculated on the molar quantity of the olefin represented by the known amount of polymer formed. The presence of the vinyl compound will decrease slightly the yield of the polymer and this factor should be considered when calculating the amount of the vinyl compound to be used in subsequent runs.

It will be found that in most instances suitable control of molecular weight, as indicated by intrinsic viscosity determinations, will be accomplished by the addition of only one vinyl compound of the type mentioned above.

However, it will also be found that reduced molecular weight by the addition of a vinyl compound reaches a plateau after a maximum has been added so that no further lowering of the molecular weight will be accomplished upon the addition of more of the same vinyl compound. Thus, in order to obtain further lowering of the intrinsic viscosity it will be necessary to add a different vinyl compound whereby the molecular weight will be still further lowered. When two or more vinyl compounds are needed the quantities which are employed are then the same as those mentioned above in which case the proportions apply to each vinyl compound rather than to the sum of the several vinyl compounds.

The addition of the vinyl compound to the polymerization vessel may be accomplished by any suitable means. In the preferred embodiment the vinyl compound which is added is selected from those which are in the same physical state as the alpha-olefin which is to be polymerized. Thus, for example, for the polymerization of ethylene a normally gaseous vinyl compound is preferred such as vinyl chloride. By this procedure the incorporation of the vinyl compound is greatly simplified in view of the small amounts which are needed. Another method of procedure is to add the vinyl compound to the polymerization vessel during the course of the polymerization. In such a case the vinyl compound may be advantageously added in the form of a solution in a hydrocarbon diluent. The hydrocarbon diluent is preferably the same as that employed in the preparation of the catalyst and may be any inert hydrocarbon solvent such as heptane, isooctane, cetane, benzene, toluene, cyclohexane and the like.

Although it is possible to use a technical grade of alpha-olefin containing the normal impurities it is generally preferred to use a purified olefin feed. Also, it is preferred to use a catalyst prepared from high purity components as well as hydrocarbon diluents which are also relatively free of impurities. The total quantity of impurities in the alpha-olefin to be polymerized is preferably less than 0.003% by weight. This may be illustrated for example in the case of ethylene wherein representative impurities amount to about 0.0001% by weight of acetylene, 0.0015% by weight of oxygen and about 0.0005% by weight of carbon monoxide. The various reactants may be purified in any suitable manner. Thus, for example, the ethylene may be treated with ammoniacal cuprous chloride or hydrogen in order to decrease or remove the acetylene. If desired, an acid such as sulfuric acid, may be employed to treat the olefin and the solvent. This is conventionally accomplished by employing dilute acid for treating the alpha-olefin and a more concentrated acid for treating the solvent and then distilling over calcium hydride.

The inventive processes of this invention are not dependent upon the quantities of the low pressure catalysts in the system because it will be found that the molecular weight, as represented by the intrinsic viscosity, will be lowered irrespective of the composition of the low pressure catalyst. As an illustration, the low pressure polymerization methods are commonly employed using a catalyst prepared from an aluminum alkyl such as aluminum diethyl chloride or aluminum triethyl and a titanium halide such as titanium tetrachloride or titanium trichloride. In these cases each component of the catalyst is present normally in an amount ranging from 2 to 20, and preferably 5 mol. per liter of solvent, or Al:Ti ratio of about 1:1.

The processes of this invention are described in greater detail in the examples which follow:

EXAMPLES I–III

A series of batchwise polymerizations of ethylene are conducted wherein the catalyst is prepared from aluminum diethyl chloride and titanium tetrachloride wherein the Al:Ti molar ratio is 1.3 in 300 mls. of isooctane at 40° C. The ethylene employed is previously purified and then passed through the isooctane solution having the catalyst in suspension for 2 hours at a temperature of 60° C. Various vinyl compounds are added to the stream of gaseous ethylene. The effect of the compounds on the intrinsic viscosity, which is determined in tetralin at 120° C., is shown in Table I.

*Table I*

| Ex. | Compound Added | I.V. of Polymer [1] |
|---|---|---|
|  | None | 1.65 |
| I | 10 mol. percent of propylene | 1.1 |
| II | 1 mol. percent of vinyl chloride | 1.0 |
| III | 50 mol. percent of vinyl chloride | 0.8 |

[1] Intrinsic viscosity.

In the above experiments the quantity of the catalysts are 13 mmol. aluminum and 10 mmol. titanium per liter of catalyst solution.

In Examples IV through VI the same procedures are followed except that the catalyst amounts to 6.5 mmol. aluminum and 0.5 mmol. of titanium per liter of catalyst solution. The results are shown in Table II.

*Table II*

| Ex. | Compound Added | I.V. of Polymer [1] |
|---|---|---|
|  | None | 2.6 |
| IV | 1 mol. percent of vinyl chloride | 1.7 |
| V | 1 mol. percent of isobutylene | 2.1 |
| VI | 5 mol. percent of isobutylene | 2.4 |

[1] Intrinsic viscosity.

EXAMPLE VII

The procedure of Example I is repeated except that propylene is the alpha-olefin to be polymerized and .1 molar percent of ethylene is employed to control the molecular weight. It is found that the intrinsic viscosity of the polypropylene solution is lower when ethylene is employed than in a companion experiment wherein none is added to the propylene feed. In a companion experiment a similar lowering of intrinsic viscosity is observed when vinyl chloride replaces the ethylene.

EXAMPLE VIII

The procedure of Example I is repeated for the polymerization of isobutylene. In this experiment the catalyst is prepared from aluminum triethyl and titanium trichloride and hexene-1 is employed as the vinyl compound. It is found that the intrinsic viscosity of the polyisobutylene in solution is less with the added hexene-1 than in a comparative experiment wherein hexene-1 is not added.

EXAMPLE IX

The procedure of Example VIII is repeated except that 5 mol percent decene-1 is used as the vinyl compound to control the molecular weight. In this case it is found that the intrinsic viscosity is not lowered as much. In another experiment 7 mol percent of the decene-1 is used which results in a greater lowering of the intrinsic viscosity.

EXAMPLE X

The procedure of Example VI is repeated except that after the addition to the 5 mol percent of isobutylene there is added an additional 5 mol percent of vinyl bromide. The intrinsic viscosity of the polyethylene solution is reduced to less than 2.0.

EXAMPLE XI

The procedure of Example I is repeated except that styrene is employed as the alpha-olefin to be polymerized and 5 mol percent of isobutylene is employed to lower the molecular weight of the polystyrene. As in the case of the above examples it is found that the molecular weight is lower than in a comparative experiment in which isobutylene is not added.

From the foregoing it will readily be appreciated that the processes of this invention are capable of many modifications of the processing techniques most of which are known in the low pressure polymerization methods of alpha-olefins. Thus, for example, the polymerization may be conducted with or without catalyst supports. It will be fairly obvious that the addition of the vinyl compound to control the molecular weight may be varied as for example, by the intermediate or irregular addition of the vinyl compound. Further, the processes of this invention are equally suitable for controlling the molecular weight of polymerized alpha-olefins other than those shown in the examples. Preferably, however, alpha-olefins having up to 10 carbon atoms are most suitable for the processes of this invention.

I claim as my invention:

1. In a process for the polymerization of alpha-olefins of 2 to 3 carbon atoms at temperatures below about 150° C. and pressures below about 500 p.s.i., the polymerization being conducted in contact with a catalyst comprising the reaction product of a halide of a metal selected from groups IVB, VB, VIB, and VIII of the periodic table and an aluminum alkyl, and an inert hydrocarbon solvent for the monomer, the improvement which comprises conducting the polymerization in the presence of from 0.001 to 5 molar percent by weight of vinyl chloride based on the weight of alpha-olefin.

2. The process as defined in claim 1, in which the alpha-olefin is ethylene.

3. The process as defined in claim 1, in which the alpha-olefin is propylene.

References Cited in the file of this patent

UNITED STATES PATENTS

| | | |
|---|---|---|
| 2,422,392 | Brubaker et al. | June 17, 1947 |
| 2,825,721 | Hogan et al. | Mar. 4, 1958 |
| 2,882,263 | Natta et al. | Apr. 14, 1959 |
| 2,898,327 | McCulloch et al. | Aug. 4, 1959 |
| 2,905,645 | Anderson et al. | Sept. 22, 1959 |

FOREIGN PATENTS

| | | |
|---|---|---|
| 538,782 | Belgium | Dec. 6, 1955 |

UNITED STATES PATENT OFFICE

CERTIFICATE OF CORRECTION

Patent No. 3,029,231

April 10, 1962

Gerrit Jan van Amerongen

It is hereby certified that error appears in the above numbered patent requiring correction and that the said Letters Patent should read as corrected below.

Column 6, line 6, strike out "by weight"; line 7, strike out "weight of".

Signed and sealed this 4th day of September 1962.

(SEAL)
Attest:

ERNEST W. SWIDER
Attesting Officer

DAVID L. LADD
Commissioner of Patents